Patented Sept. 11, 1934

1,973,474

UNITED STATES PATENT OFFICE 1,973,474

PROCESS OF PRODUCING ANTIKNOCK COMPOUNDS

Gustav Egloff and Raymond E. Schaad, Chicago, Ill., assignors to Universal Oil Products Company, Chicago, Ill., a corporation of South Dakota No Drawing. Application January 14, 1928, Serial No. 246,910

3 Claims. (Cl. 260—127)

This invention relates to improvements in the process of producing anti-knock compounds and is more particularly directed to the production of such anti-knock compounds from hydrocarbon gases. In certain types of high compression engines, it is desirable, if not necessary, that the motor fuel used have sufficient anti-knock properties to prevent undue velocity of combustion. Ordinary gasoline is generally lacking in sufficient of these anti-knock properties, particularly with very high compression engines.

By the present invention, we produce from incondensible gases, such as natural gas, gases produced from the cracking of petroleum, coke, oven gases or other hydrocarbon gases, anti-knock compounds.

To this end, we may take incondensible hydrocarbon gases, as above stated, and pass them together with ammonia through a coil of say 400 feet of 4-inch pipe mounted in a suitable furnace where the gases may be heated to a temperature of 1200° F. or more. This will result in not only cracking the gases, but causing a chemical reaction between the gases and the ammonia and produce therefrom substantial quantities of anti-knock compounds, for example, the amino compounds. From the coil, the products so treated may thence be passed through a suitable condenser, cooled and collected, and the incondensible gases separated from the liquid constituents and the latter may again be re-treated by again passing them through the heating coil in the presence of additional ammonia and raw charging stock.

A pressure of say 1000 lbs. per square inch may be maintained on the heating coil and the balance of the system, or a reduced pressure may be maintained on the balance of the apparatus. An invention may also be carried out in the manner above described in which the apparatus, instead of being maintained under high pressure, may be maintained under relatively low pressure down to atmospheric or under vacuum.

The anti-knock compounds so produced may then be mixed with gasoline in the desired proportion to obtain a motor fuel having the required anti-knock properties.

By the term "incondensible gas" we mean a gas which is not condensible under ordinary conditions of temperature and pressure and by "hydrocarbon gas" we mean a gas composed of or containing hydrocarbons which do not condense under ordinary conditions of temperature and pressure. By "cracking temperature" we mean a degree of heat adequate to effect decomposition within the materials being treated.

We claim as our invention:

1. A process of producing anti-knock compounds consisting in subjecting hydrocarbon gases in the presence of ammonia to temperatures sufficient to crack the gases but insufficient to substantially decompose the ammonia, continuing the reaction sufficiently long to cause the ammonia to react on the cracked gases and thereby to produce substantial quantities of amino compounds and then withdrawing and cooling the gases and separating the incondensible portions from the condensate.

2. A process of producing anti-knock compounds consisting in subjecting hydrocarbon gases in the presence of ammonia to temperatures sufficient to crack the gases but insufficient to substantially decompose the ammonia, continuing the reaction sufficiently long to cause the ammonia to react on the cracked gases and thereby to produce substantial quantities of amino compounds and then withdrawing and cooling the gases and separating the incondensible portions from the condensate, and maintaining a super-atmospheric pressure on the gases while such reaction is taking place.

3. A process of producing nitrogen bases consisting in subjecting incondensible hydrocarbon gases in the presence of ammonia to a temperature of about 1200° F. under superatmospheric pressure, causing the ammonia to react on the gases to produce nitrogen bases, withdrawing and cooling the gases and separating the incondensible portions from the condensate.

GUSTAV EGLOFF.
RAYMOND E. SCHAAD.